US008614530B2

(12) United States Patent
Chamberlin et al.

(10) Patent No.: US 8,614,530 B2
(45) Date of Patent: Dec. 24, 2013

(54) STATOR CORE FOR AN ELECTRIC MACHINE

(75) Inventors: Bradley D. Chamberlin, Pendleton, IN (US); Mark A. Stephenson, Fairland, IN (US); Larry A. Kubes, Climax, MI (US)

(73) Assignee: Remy Technologies, L.L.C., Pendleton, IN (US)

( * ) Notice: Subject to any disclaimer, the term of this patent is extended or adjusted under 35 U.S.C. 154(b) by 245 days.

(21) Appl. No.: 12/640,297

(22) Filed: Dec. 17, 2009

(65) Prior Publication Data

US 2011/0148243 A1    Jun. 23, 2011

(51) Int. Cl.
*H02K 11/00* (2006.01)
(52) U.S. Cl.
USPC ............................. 310/180; 310/208; 310/71
(58) Field of Classification Search
USPC .................... 310/180, 179, 71, 208, 203, 198
See application file for complete search history.

(56) References Cited

U.S. PATENT DOCUMENTS

| | | | |
|---|---|---|---|
| 2,969,195 A | 1/1961 | Leithe | |
| 4,446,393 A * | 5/1984 | Finegold | 310/184 |
| 4,752,707 A * | 6/1988 | Morrill | 310/184 |
| 6,530,140 B2 | 3/2003 | Maeda et al. | |
| 6,553,650 B2 | 4/2003 | Nakamura et al. | |
| 6,712,307 B2 | 3/2004 | Iwase et al. | |
| 6,865,796 B1 | 3/2005 | Oohashi et al. | |
| 6,941,644 B2 | 9/2005 | Shteynberg et al. | |
| 7,004,420 B2 | 2/2006 | Stratico et al. | |
| 7,159,816 B2 | 1/2007 | Sweeney et al. | |
| 7,213,784 B2 | 5/2007 | Lundahl | |
| 7,243,873 B2 | 7/2007 | Noji | |
| 7,311,284 B2 | 12/2007 | Hashimoto et al. | |
| 7,543,774 B2 | 6/2009 | Stroebel et al. | |
| 7,694,909 B1 | 4/2010 | Chamberlin et al. | |
| 7,712,697 B1 | 5/2010 | Chamberlin et al. | |
| 2001/0019234 A1 * | 9/2001 | Murakami et al. | 310/180 |
| 2003/0089812 A1 | 5/2003 | Iwase et al. | |
| 2003/0102765 A1 * | 6/2003 | Knoll et al. | 310/218 |
| 2004/0173710 A1 | 9/2004 | Stratico et al. | |
| 2005/0029385 A1 | 2/2005 | Stratico et al. | |
| 2005/0133655 A1 | 6/2005 | Hashimoto et al. | |
| 2005/0174006 A1 * | 8/2005 | Kolomeitsev et al. | 310/180 |
| 2005/0247815 A1 | 11/2005 | Sweeney et al. | |
| 2005/0258707 A1 * | 11/2005 | Shteynberg et al. | 310/218 |
| 2006/0158098 A1 | 7/2006 | Raychaudhuri et al. | |
| 2006/0169822 A1 | 8/2006 | Noji | |
| 2006/0261697 A1 * | 11/2006 | Baumgartner et al. | 310/180 |
| 2006/0273214 A1 * | 12/2006 | Stratico et al. | 242/432 |
| 2007/0181732 A1 | 8/2007 | Noji | |
| 2008/0203213 A1 | 8/2008 | Noji | |
| 2009/0057473 A1 | 3/2009 | Ujiie | |

* cited by examiner

*Primary Examiner* — Tran Nguyen
*Assistant Examiner* — Leda Pham
(74) *Attorney, Agent, or Firm* — Cantor Colburn LLP

(57) ABSTRACT

A stator includes a body portion having an outer portion and an inner portion that defines an interior region, a plurality of stator teeth members extending from the inner portion into the interior region, and at least one continuous conductor wound around select ones of the plurality of stator teeth members to form at least one pole. Each of the plurality of stator teeth members including a number of wraps of the at least one continuous conductor. The at least one continuous conductor including a number of twists that is fewer than the number of wraps.

16 Claims, 3 Drawing Sheets

STATOR CORE FOR AN ELECTRIC MACHINE

BACKGROUND OF THE INVENTION

The subject matter disclosed herein relates to the art of electric machines and, more particularly, to a stator core for an electric machine.

At present, many stator cores are wound with round wire. The stator core is held stationary and the round wire is fed through a winding needle that is rotated about a stator tooth. Once the stator tooth is wound, the wire is advanced to a subsequent stator tooth. At each tooth, the winding needle not only travels along a circular path but also moves in and out to layer the wire. Upon exiting the winding needle, the wire twists as a result of the rotation created when wrapping the stator tooth.

In order to avoid twisting, some manufactures employ a stator core including a plurality of individually wound stator teeth that are joined together to form individual poles. In the case of a 24 pole stator, as many as 96 connections are required. In other cases, multiple wires are simultaneously wound around a tooth. Once wound, the wires are translated to another tooth. This process continues, until a predetermined number of teeth are wound. Once the predetermined number of teeth are wound, the wires are cut and connected to a main bus. Such systems also require a large number of final connections as each of the multiple wires must be connected to a main bus.

BRIEF DESCRIPTION OF THE INVENTION

According to one aspect of the invention, a stator includes a body portion having an outer portion and an inner portion that defines an interior region, a plurality of stator teeth members extending from the inner portion into the interior region, and at least one continuous conductor wound around select ones of the plurality of stator teeth members to form at least one pole. Each of the plurality of stator teeth members including a number of wraps of the at least one continuous conductor. The at least one continuous conductor including a number of twists that is fewer than the number of wraps.

According to another aspect of the invention, an electric machine includes a housing, a rotor rotatably mounted within the housing, and a stator extending about the rotor. The stator includes a body portion having an outer portion and an inner portion that defines an interior region, a plurality of stator teeth members extending from the inner portion into the interior region, and at least one continuous conductor wound around select ones of the plurality of stator teeth members to form at least one pole. Each of the plurality of stator teeth members includes a number of wraps of the at least one continuous conductor. The at least one continuous conductor including a number of twists that is fewer than the number of wraps.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
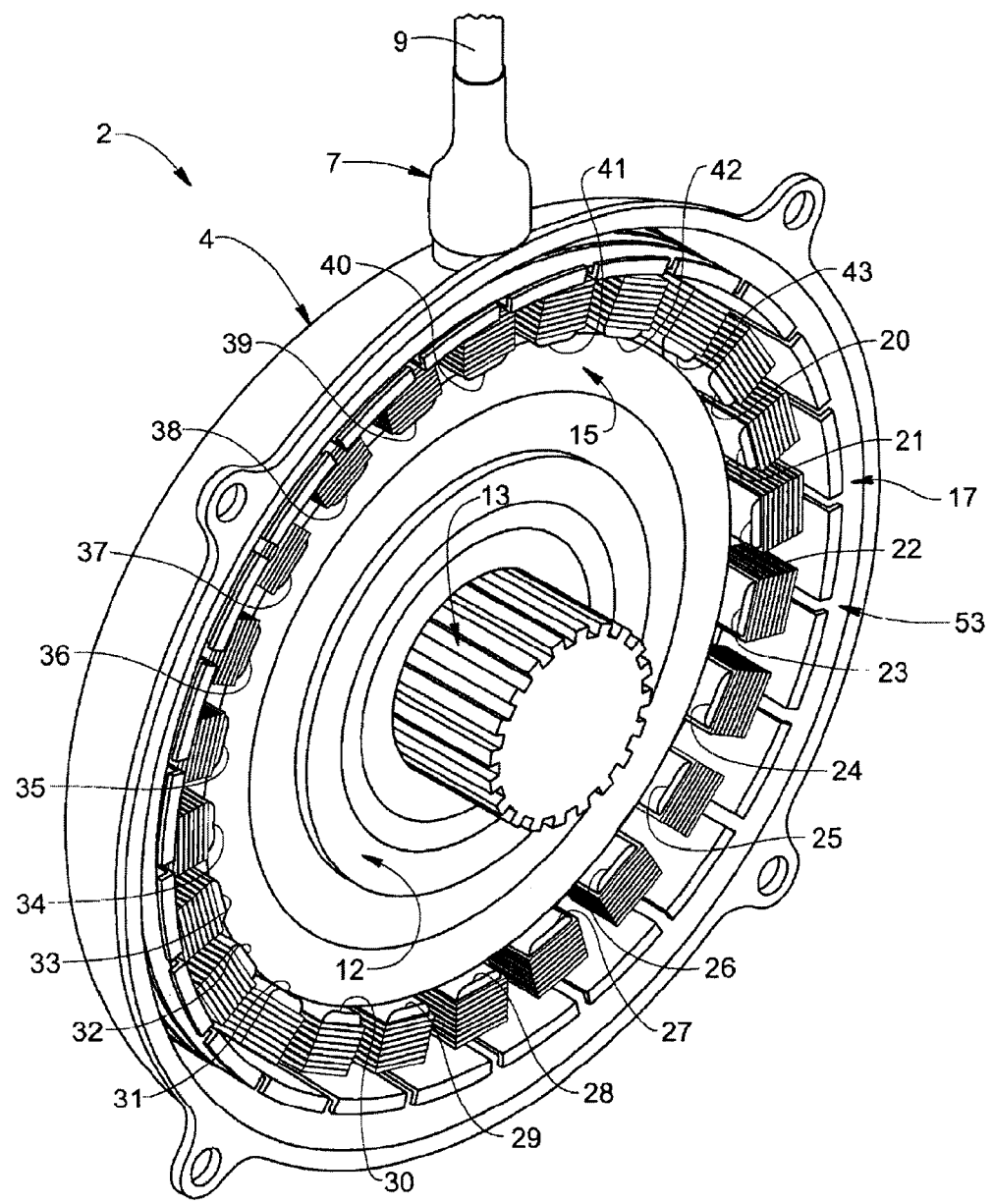
FIG. 1 is a perspective view of an electric machine including a stator constructed in accordance with an exemplary embodiment.
Figure 2:
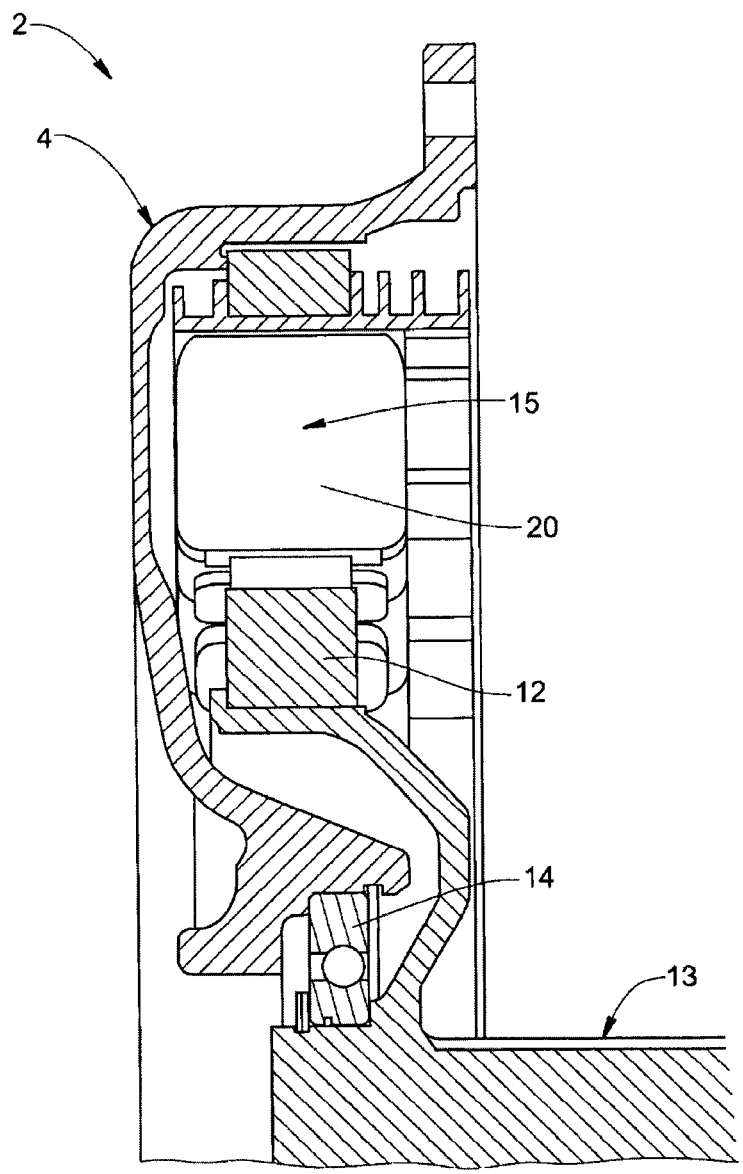
FIG. 2 is a cross-sectional side view of the electric machine of FIG. 1.

With reference to FIGS. 1 and 2, an electric machine constructed in accordance with an exemplary embodiment is indicated generally at 2. Electric machine 2 includes a housing 4 provided with a connector member 7. Connector member 7 receives an electrical cable 9. Electric machine 2 is further shown to include a rotor 12 having a hub portion 13 that is rotatably supported to housing 4 via a bearing 14. Rotor 12 is configured and disposed to rotate within a stator 15.

Figure 3:
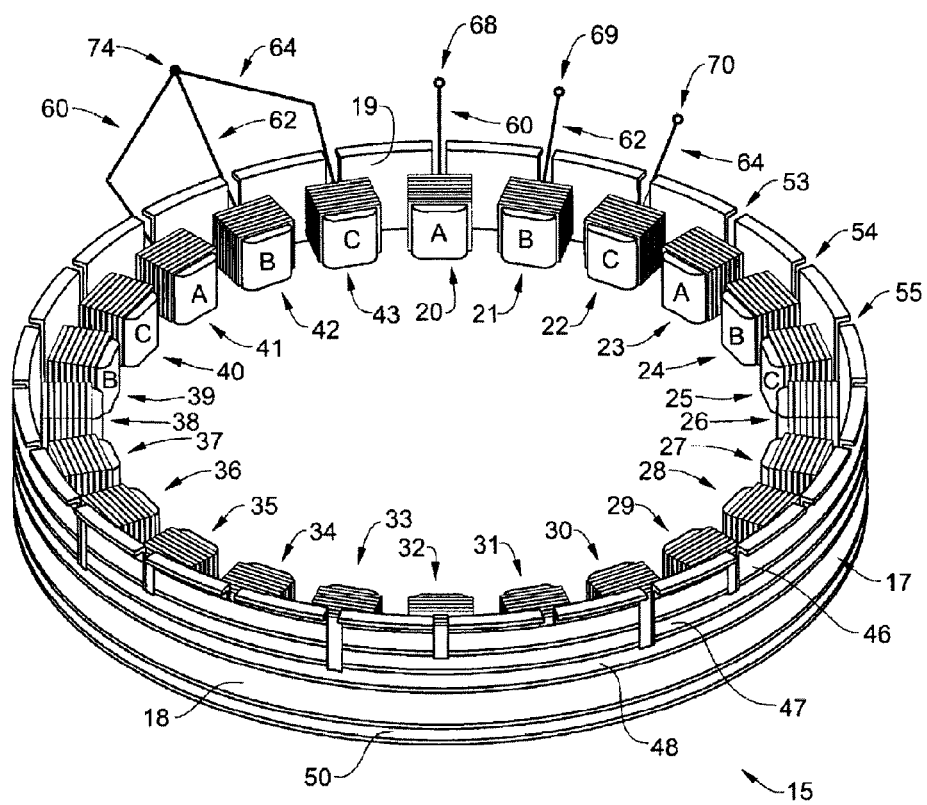
FIG. 3 is a perspective view of the stator of FIG. 1.

As best shown in FIG. 3, stator 15 includes a body member 17 having an outer portion 18 and an inner portion 19, and a plurality of stator teeth members 20-43. Stator teeth members 20-43 project from inner portion 19 and are arranged in sets of electrical poles, namely, poles A, B, and C. At this point it should be understood that while shown as having a circular geometry, stator 15 could include other shapes, including rectangular and oval geometries. In the exemplary embodiment shown, body member 17 includes a plurality of phase conductor channels 46-48 as well as a neutral conductor channel 50. In a manner that will be discussed more fully below, phase conductor channels 46-48 provide a passage for a conductor that passes from select ones of the plurality of stator teeth members 20-43 to form each pole A, B, and C. Towards that end, body member 17 includes a plurality of conductor passages, three of which are indicated at 53-55. Conductor passage 53 corresponds to pole A and provides a passage between stator tooth 23 and phase conductor channel 46. Similarly, conductor passage 54 is associated with pole B and extends between stator tooth 24 and phase conductor channel 47 while conductor passage 55 is associated with pole C and extends between stator tooth 25 and phase conductor channel 48.

In accordance with an exemplary embodiment, stator 15 includes a first continuous conductor 60 associated with pole A, a second continuous conductor 62 associated with pole B, and a third continuous conductor 64 associated with pole C. Each continuous conductor 60, 62, and 64 includes a corresponding terminal 68, 69, and 70 that serves as an external connection point. As will be discussed more fully below, each continuous conductor 60, 62, and 64 extends around body member 17 to a common neutral connection point 74. Neutral connection point 74 is provided within neutral conductor channel 50 on body member 17.

In further accordance with the exemplary embodiment, first continuous conductor 60 extends, uninterrupted, between each of the plurality of stator teeth members 20, 23, 26, 29, 32, 35, 38 and 41 that form pole A. More specifically, first continuous conductor 60 is wrapped around stator tooth 20 and passes through phase conductor channel 46 to stator tooth 23. Continuous conductor 60 wraps around stator tooth 23 before passing back through phase conductor channel 46 towards stator tooth 26. In accordance with the exemplary embodiment, first continuous conductor 60 is wrapped around the plurality of stator teeth members associated with pole A in a manner that results in a number of twists in first continuous conductor 60 being fewer than the number of wraps. In one embodiment, first continuous conductor 60 does not acquire any twists.

In a manner similar to that described above, second continuous conductor 62 extends from terminal 69 and about stator tooth 21. Second conductor 62 then passes from stator tooth 21 through phase conductor channel 47 to stator tooth 24 and subsequently connects the remaining plurality of stator teeth members 27, 30, 33, 36, 39, and 42 that form pole B. In a manner also similar to that described above, second continuous conductor 62 extends uninterrupted and in a manner that results in a number of twists in second continuous conductor 62 being fewer than the number of wraps. In one embodiment, second continuous conductor 62 does not acquire any twists. Likewise, third continuous conductor 64 connects the plurality of stator teeth members 22, 25, 28, 31, 34, 37, 40, and 43 that form pole C. Third continuous conductor 64 extends uninterrupted and in a manner that results in a number of twists in third continuous conductor 64 being fewer than the number of wraps. In one embodiment, third continuous conductor 64 does not acquire any twists.

With this arrangement, first, second and third continuous conductors 60, 62 and 64 wrap about respective ones of the plurality of stator teeth members that form poles A, B and C without creating bulk associated with wire that is twisted. Towards that end, each continuous conductor 60, 62 and 64 is formed having a non-circular cross section. In the exemplary embodiment shown, each continuous conductor 60, 62 and 64 is formed having a rectangular cross section. With this arrangement, stator 15 can be formed having a compact form factor thereby providing enhanced operational efficiencies for electric machine 2.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A stator comprising:
a body portion having an outer portion and an inner portion that defines an interior region, the outer portion including a plurality of phase conductor channels;
a plurality of stator teeth members extending directly from the inner portion into the interior region; and
at least one continuous conductor wound around select ones of the plurality of stator teeth members to form at least one pole, each of the plurality of stator teeth members including a number of wraps of the at least one continuous conductor, the at least one continuous conductor including a number of twists that is fewer than the number of wraps, wherein the at least one continuous conductor passes between select ones of the plurality of teeth members through at least one of the plurality of phase conductor channels.

2. The stator according to claim 1, wherein the at least one continuous conductor includes a plurality of continuous conductors, each of the plurality of continuous conductors being wound around select ones of the plurality of stator teeth members to form a pole.

3. The stator according to claim 2, further comprising: a single connection point connecting the plurality of continuous conductors.

4. The stator according to claim 3, further comprising: a plurality of external connection points, each of the plurality of continuous conductors extending uninterrupted from the single connection point to a corresponding one of the plurality of external connection points.

5. The stator according to claim 1, wherein the at least one continuous conductor includes three continuous conductors, each of the three continuous conductors being wound around select ones of the plurality of teeth members forming three poles.

6. The stator according to claim 1, wherein the at least one continuous conductor includes a rectangular cross-section.

7. The stator according to claim 1, wherein the at least one continuous conductor includes zero twists.

8. An electric machine comprising:
a housing;
a rotor rotatably mounted within the housing; and
a stator including a stator core extending about the rotor, the stator core including:
a body portion having an outer portion and an inner portion that defines an interior region, the outer portion including a plurality of phase conductor channels;
a plurality of stator teeth members extending directly from the inner portion into the interior region; and
at least one continuous conductor wound around select ones of the plurality of stator teeth members to form at least one pole, each of the plurality of stator teeth members including a number of wraps of the at least one continuous conductor, the at least one continuous conductor including a number of twists that is fewer than the number of wraps, wherein the at least one continuous conductor passes between select ones of the plurality of teeth members through at least one of the plurality of phase conductor channels.

9. The electric machine according to claim 8, wherein the at least one continuous conductor includes a plurality of continuous conductors, each of the plurality of continuous conductors being would around select ones of the plurality of stator teeth members to form a pole.

10. The electric machine according to claim 9, further comprising: a common connection point connecting the plurality of continuous conductors.

11. The electric machine according to claim 10, further comprising: a plurality of external connection points, each of the plurality of continuous conductors extending uninterrupted from the common connection point to a corresponding one of the plurality of external connection points.

12. The electric machine according to claim 8, wherein the at least one continuous conductor includes three continuous conductors, each of the three continuous conductors being wound around select ones of the plurality of stator teeth members forming three poles.

13. The electric machine according to claim 8, wherein the at least one continuous conductor includes a rectangular cross-section.

14. The electric machine according to claim 8, wherein the at least one continuous conductor includes zero twists.

15. The stator according to claim 1, wherein the body portion includes a plurality of conductor passages that extend between select ones of the plurality of stator teeth and select ones of the phase conductor channels.

16. The stator according to claim 8, wherein the body portion includes a plurality of conductor passages that extend between select ones of the plurality of stator teeth and select ones of the phase conductor channels.

* * * * *